Patented Apr. 24, 1923.

1,453,060

UNITED STATES PATENT OFFICE.

CARL BOSCH, OF LUDWIGSHAFEN-ON-THE-RHINE, ERICH DEHNEL, OF RÖSSEN, NEAR MERSEBURG, AND CARL KIRCHER, OF LUDWIGSHAFEN-ON-THE-RHINE, GERMANY, ASSIGNORS, BY MESNE ASSIGNMENTS, TO BADISCHE ANILIN & SODA FABRIK, OF LUDWIGSHAFEN-ON-THE-RHINE, BAVARIA, GERMANY, A CORPORATION OF THE GRAND DUCHY OF BADEN.

CONVERSION OF AMMONIA INTO AMMONIUM CHLORIDE.

No Drawing.    Application filed July 9, 1920. Serial No. 395,150.

*To all whom it may concern:*

Be it known that we, CARL BOSCH, ERICH DEHNEL, and CARL KIRCHER, citizens of Germany, residing at Ludwigshafen-on-the-Rhine, Rossen, near Merseburg, and Ludwigshafen-on-the-Rhine, respectively, Germany, have invented new and useful Improvements in Conversion of Ammonia into Ammonium Chloride, of which the following is a specification.

Ammonia obtained synthetically in the free state has hitherto been transformed into a condition suitable for use as a fertilizer and for easier transport (like ammonia produced in gas works, coke factories and the like) by conversion into sulfate of ammonia.

We have now found that it is very advantageous for the transformation of ammonia which has been produced synthetically in large quantities into a solid form to combine the production of ammonia synthetically with the manufacture of soda by the ammonia process, without employing, in the latter process, the same ammonia continuously in a circulating system as has been the practice hitherto, but by repeatedly introducing fresh free ammonia while withdrawing the ammonium chloride which is contained in the mother-liquors. Thus, the ammonia synthetically produced in the free state is directly obtained in the form of a good marketable product possessing excellent fertilizing properties and at the same time the manufacture of soda is simplified by avoiding the recovery of ammonia and the troublesome removal of waste liquors. The process is particularly advantageous if, in addition, the manufacture of artificial sodium nitrate is carried out by oxidizing a part of the synthetic ammonia to nitric acid and combining it with soda. In this way a more intimate combination of the industries of ammonia and soda is brought about, it being possible to employ cheap sodium carbonate obtained on the spot or the sodium bicarbonate itself for absorbing the nitrous oxids or for neutralizing the nitric acid.

We have further found that the extraction of ammonium chloride from the mother liquors of the soda manufacture can be carried out by alternately subjecting the mother liquors to concentration by heat, and, after the separation of the sodium chloride thus obtained, to a cooling, whereby the precipitation of the ammonium chloride is effected. If the filtrate which remains after the production of sodium bicarbonate is concentrated at an ordinary or diminished pressure, ammonium bicarbonate first escapes, and on continuing the evaporation pure common salt is soon precipitated. The concentration is discontinued before, or as soon as, ammonium chloride begins to precipitate, the common salt is then withdrawn while the solution is still hot, and pure ammonium chloride crystallizes out on cooling the mother liquor. From the liquor remaining after the production of this salt, sodium chloride may again be recovered at an elevated temperature and ammonium chloride in the cold in the described manner; all the salt can thus be obtained in a pure state, and similar liquors obtained in different operations may naturally be mixed to any desired extent.

A special course of working consists in evaporating the mother liquor only to such an extent that common salt is just precipitated, then first producing ammonium chloride by cooling and then sodium chloride by further evaporating at an elevated temperature and so on.

It has proved particularly advantageous in the course of the process to add suitable quantities of residual liquors, that is, the remaining cold-saturated solution of chloride of ammonium and chloride of sodium to the original mother liquor before or during the evaporation, and after this allowing the fractional crystallization to begin. Thus, the first precipitation of common salt can be considerably increased and it can easily be worked in such a way that in each case the whole quantity of pure sodium chloride and ammonium chloride is obtained corresponding to the amount contained in the mother liquor employed.

Our invention and the manner of carrying the same into effect is further illustrated by the following example but the invention is not limited thereto. The parts are by weight.

*Example.*

To 1000 litres of mother liquor obtained from the ammonia soda process containing, in addition to residual bicarbonate, about 820 litres of water, 120 kilograms of common salt and 200 kilograms of ammonium chloride, are added 1000 litres of a cold-saturated solution of chloride of sodium and chloride of ammonium, obtained as residual liquors from a previous separation of salt in the cold. 820 litres of water are then evaporated at about 100 degrees centigrade, ammonium bicarbonate being obtained in the distillate, the salt, which has crystallized out—about 120 kilograms of nearly pure common salt— is drawn off and the liquor is cooled whereupon 200 kilograms of practically pure ammonium chloride crystallize out. The remaining 1000 litres of residual liquor may be employed for a new operation as described.

The quantities of the residual liquor and the other conditions may be varied within wide limits according to the composition of the mother liquor and the manner and temperature of concentrating, the only important condition being that the concentration by heating be not carried further in either case than is required for the desired purity of the common salt, which returns into the process.

We have further found that in the process referred to the cooling in order to separate the ammonium chloride can be carried out with considerable advantage by submitting the solution which has been freed from the common salt while still hot to a concentration in vacuo. The evaporation of the water of solution causes the temperature to fall sufficiently quickly of its own accord and even in case of very considerable cooling no sodium chloride is precipitated along with the ammonium chloride.

The following example further illustrates how this mode of working may be carried into effect but the example can be departed from.

The mother liquor obtained after the separation of sodium bicarbonate is first evaporated at from 60 degrees to 80 degrees centigrade and then further concentrated at 100 degrees centigrade until the sodium chloride which is precipitated shows an admixture of ammonium chloride. The salt is then removed while the solution is still hot and the filtrate having a temperature of about 90 degrees centigrade is subjected to a vacuum in suitable apparatus. By the evaporation of for instance 10 per cent of the water of solution the temperature quickly falls to about 35 degrees centigrade and large quantities of pure ammonium chloride separate out in the form of coarse crystals. This salt is removed and the residual liquor is employed for a new batch or added to a bicarbonate mother liquor before the same is concentrated by heat. By an intense agitation of the liquor, for example by the introduction of a small amount of air, the evaporation and cooling in the vacuum can be accelerated.

No special cooling is necessary as a rule, the temperature falling sufficiently quickly by itself, but it may be advantageous to facilitate the ordinary external cooling of the apparatus by the surrounding air, and towards the end of the process to further cool to room temperature or even below. On the other hand, especially if the solutions have not been sufficiently concentrated, the yield of ammonium chloride may sometimes be increased by the introduction of a certain quantity of heat during the concentration in vacuo; the introduction of such heat is however limited by the fact that sodium chloride would eventually be precipitated in the case of excessive evaporation of water from the ammonium chloride liquor.

We claim:

1. The process of transforming synthetic ammonia into a salt for use as a fertilizer by employing such ammonia in the ammonia soda process and withdrawing from the bicarbonate mother liquor ammonium chloride by alternately concentrating, removing the sodium chloride separated and cooling to precipitate ammonium chloride.

2. The process of transforming ammonia into a salt for use as a fertilizer by introducing the ammonia into the ammonia soda process and withdrawing from the bicarbonate mother liquor ammonium chloride by alternately concentrating by heat removing the sodium chloride separating out and then cooling by subjecting the solution to a vacuum.

3. The process of transforming ammonia into a salt for use as a fertilizer by introducing ammonia into the ammonia soda process and withdrawing from the bicarbonate mother liquor ammonium chloride by concentrating the solution until sodium chloride is precipitated then cooling by subjecting to a vacuum, concentrating again and removing the sodium chloride thereby precipitated and alternately repeating the operations while adding fresh mother liquor.

In testimony whereof we have hereunto set our hands.

CARL BOSCH.
ERICH DEHNEL.
CARL KIRCHER.